3,150,186
PREPARATION OF 4,4'-DIAMINODI-PHENYLDISULFIDES

Duncan J. Crowley, Penns Grove, N.J., assignor to E. I. du Pont de Nemours and Company, Wilmington, Del., a corporation of Delaware
No Drawing. Filed Aug. 23, 1961, Ser. No. 133,329
5 Claims. (Cl. 260—580)

This invention relates to a process for the preparation of 4,4'-diaminodiphenyldisulfides. More particularly, this invention relates to a method for the preparation of 4,4'-dimainodiphenyldisulfides by a one-step procedure.

4,4'-Diaminodiphenyldisulfide and its 2,2'-dichloro substituted derivative are well-known compounds and have been used for many years in the preparation of azo dyes. More recently they have been found to be effective fungicides, mildew-proofing agents, and curing agents for epoxy resins.

These compounds have previously been prepared by the reaction of p-chloronitrobenzene or 3,4-dichloronitrobenzene with sodium sulfide. This reaction, as described in U.S. Patent 1,933,217, is essentially a multi-step procedure. The first step involves the reaction of a chloronitrobenzene with sodium sulfide and proceeds in two phases—the replacement of the chlorine atom and the reduction of the nitro group to form an aminothiophenol. The second step involves oxidation of the aminothiophenol to the diaminodiphenyldisulfide.

The above-described method has the inherent disadvantages of most multiple-step processes, namely, those of higher material and procedural costs. In the particular procedure of the present invention, the disulfide is obtained directly, thereby overcoming these undesirable features and providing a great advance in the art.

It is an object of this invention to provide a one-step process for the preparation of 4,4'-diaminodiphenyldisulfide. It is a further object of this invention to provide a one-step process for the preparation of 4,4'-diaminodiphenyldisulfides which is more economical in both chemical and operational costs and more productive in its higher overall yield than prior art processes. These and other objects of this invention will appear hereinafter.

The objects of this invention are accomplished by providing a method for the preparation of 4,4'-diaminodiphenyldisulfides which comprises reacting a p-chloronitrobenzene of the formula:

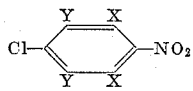

where Y is H, Cl, lower alkyl or lower alkoxy and X is H, lower alkyl or lower alkoxy, with sodium sulfhydrate in an aqueous medium. The product can be removed from the reaction mixture by any of the conventional separation methods. This product has the following general formula:

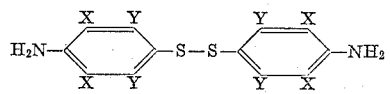

where X and Y are defined by the aforesaid.

The initial reaction of p-chloronitrobenzene with sodium sulfhydrate may take two forms—the reduction of the nitro group and the replacement of the chlorine atom by a mercaptan group. If the nitro group is reduced first, the chlorine atom is deactivated and is not replaceable under the reaction conditions. It is thus desirable to suppress this reduction and carry out the process in such a way that the replacement of the chlorine atom will be favored.

It has been found that by adding an aqueous sulfhydrate solution very slowly to a mixture of p-chloronitrobenzene and water at about 100° C., the replacement of the chlorine atom with a mercaptan group is favored and the reaction proceeds to the subsequent formation of the disulfide and the reduction of the nitro groups. High theoretical yields of 4,4'-diaminodiphenyldisulfides are obtained economically by carrying out the process in this manner.

More specifically the process consists of mixing the chloronitrobenzene with water in the ratio of one part of chloronitrobenzene to one to four parts of water. The mixture is heated with agitation to 105° to 115° C. at atmospheric pressure. A 40–50% aqueous solution of sodium sulfhydrate is added very slowly. Usually two to four moles of sodium sulfhydrate are used per mole of chloronitrobenzene. The sulfhydrate solution addition is completed in about three to five fours and the reaction mixture is then held at mild refluxing conditions for an additional eight to twenty-four hours. The temperature is maintained between 105° and 115° C.; and, agitation is continued throughout the addition of the sulfhydrate and the subsequent refluxing. The mixture is cooled and the product may be separated at about 80° C. as a yellow oil. Any conventional separating means, such as withdrawing the lower aqueous layer, may be employed.

In a preferred embodiment of this invention the chloronitrobenzene mixture contains one part chloronitrobenzene to two parts of water, by weight. The preferred temperature of this mixture is within the range of 100°–125° C. Two and one-half moles of sodium sulfhydrate are used per mole of chloronitrobenzene. It is also preferred to recover the product as a yellow solid by cooling the reaction mixture to 20° to 25° C. and separating by filtration or other convenient means. A fine crystalline product may be obtained by adding a surfactant to the mixture of chloronitrobenzene and water. A small amount (0.5 to 1.5 parts of surfactant per 100 parts of chloronitrobenzene by weight) is sufficient. As the surfactant, an alkyl aryl sulfonate such as the sodium salt of dodecyl benzene sulfonic acid, the sodium salt of the condensation product of formaldehyde with naphthalene sulfonic acid, or sodium alkyl naphthalene sulfonate, is preferred.

Some specific examples of chloronitrobenzene compounds which may be used in this invention are:

p-chloronitrobenzene
3,4-dichloronitrobenzene
3,4-dichloro-2-methylnitrobenzene
4-chloro-2-methoxynitrobenzene
4-chloro-3-methylnitrobenzene
4-chloro-3-propylnitrobenzene
4-chloro-2-ethylnitrobenzene
4-chloro-3-methoxynitrobenzene
4-chloro-3-propoxynitrobenzene
3,4-dichloro-3-methoxynitrobenzene The examples which follow illustrate specific embodiments of the operation of this invention. Parts are by weight unless otherwise indicated.

Example I

One hundred fifty-eight (158) parts of p-chloronitrobenzene and two hundred (200) parts of water were charged into a Pyrex round-bottomed flask equipped with stirrer, reflux condenser, thermometer, dropping funnel and heating mantle. The agitated mixture was heated to reflux temperature; and, two hundred eighty-five (285) parts of a 44% sodium sulfhydrate solution were slowly added to the mixture of water and molten p-chloronitrobenzene. There was a vigorous reaction following the initial (5%) addition of the sulfhydrate. (After this temperature "kick" subsides, the rate of the addition of the sodium sulfhydrate solution may be increased so that all of it is added during a 3–5 hour period.) The flask was maintained under mild refluxing conditions (about 108° C.) and held with stirring for about sixteen (16) hours. The reaction mixture was cooled to 20–25° C.; and, the yellow solid was separated by filtration, washed, and dried. One hundred sixteen (116) parts of the product, 4,4'-diaminodiphenyldisulfide, having a melting point of 70–75° C. and a sulfur content of 25.1%, was obtained in a yield of 93.5%.

*Example II*

The details of Example I were followed with the addition of 1.6 parts of a surfactant, the sodium salt of the condensation product of formaldehyde with naphthalene sulfonic acid, to the reaction mixture. After refluxing for twenty (20) hours the mixture was cooled with stirring to 45–50° C. The product separated as fine crystals. The mixture was cooled to 20–25° C. and filtered. The crystalline filter cake was washed with water and dried at 60–65° C. A yield of 95% of 4,4'-diaminodiphenyldisulfide was obtained.

*Example III*

In a manner similar to that described in Example I, one hundred ninety-two (192) parts of 3,4-dichloronitrobenzene, two (2) parts of a surfactant, the sodium salt of the condensation product of formaldehyde with naphthalene sulfonic acid, and two hundred (200) parts of water were charged into a round-bottomed Pyrex flask, equipped with stirrer, reflux condenser, thermometer, dropping funnel and heating mantle. Two hundred eighty-five (285) parts of a 44% sodium sulfhydrate solution were cautiously added over a three-hour period, a gentle reflux being maintained at about 110° C. The contents of the flask were held at reflux temperature with agitation for about sixteen (16) hours. Upon cooling with stirring the 4,4'-diamino-2,2'-dichlorodiphenyldisulfide separated as fine crystals. The contents of the flask were cooled at about 20° C., filtered, washed with cold water, and dried. The crude product weighed one hundred fifty (150) parts (95% of the theory); the melting point was 125° C.; sulfur content and chlorine content were 19.1% and 22.4% respectively.

The preceeding representative examples may be varied by one skilled in the art to achieve essentially the same results.

It should be noted that aminothiophenol can not be isolated in any appreciable quantity from the reaction mixture of the present invention. Instead the disulfide is formed in very high yield.

Both 4,4'-diaminodiphenyldisulfide and 4,4'-diamino-2,2'-dichlorodiphenyldisulfide were tested as epoxy resin curing agents according to standard test procedures for plastics. Both materials proved to be effective resin curing agents.

It will be apparent that this invention provides a process for the direct preparation of 4,4'-diaminodiphenyldisulfides by reacting a p-chloronitrobenzene with sodium sulfhydrate which is simple, practical, economical, and capable of giving extremely high yields. Therefore, this invention constitutes a valuable advance in and contribution to the art.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A process for the preparation of 4,4'-diaminodiphenyldisulfides which comprises adding an aqueous solution of sodium sulfhydrate slowly over a period of three to five hours to a mixture of water and a p-chloronitrobenzene having the formula:

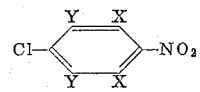

wherein Y is a member selected from the group consisting of H, Cl, lower alkyl, and lower alkoxy, and wherein X is a member selected from the group consisting of H, lower alkyl, and lower alkoxy, the resulting mixture being maintained at a temperature within the range of 100°–125° C.

2. A process for the preparation of 4,4'-diaminodiphenyldisulfides which comprises adding a 40–50% aqueous solution of sodium sulfhydrate slowly over a period of three to five hours to a mixture of water and a p-chloronitrobenzene having the formula:

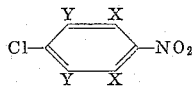

wherein Y is a member selected from the group consisting of H, Cl, lower alkyl, and lower alkoxy, and wherein X is a member selected from the group consisting of H, lower alkyl, and lower alkoxy, the resulting mixture being maintained at a temperature within the range of 100°–125° C., cooling the resultant mixture to a temperature between 20° C. and 25° C., and filtering the resultant product from the mixture.

3. The process described in claim 1 wherein the mixture of water and p-chloronitrobenzene contains one part p-chloronitrobenzene to two parts water, by weight.

4. The process described in claim 1 wherein the p-chloronitrobenzene is p-chloronitrobenzene.

5. A process for the preparation of 4,4'-diaminodiphenyldisulfides which comprises adding a 40–50% aqueous solution of sodium sulfhydrate slowly over a period of from three to five hours to a mixture of water, a small amount of an alkyl aryl sulfonate surfactant, and a p-chloronitrobenzene having the formula:

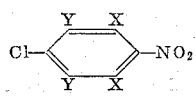

wherein Y is a member selected from the grup consisting of H, Cl, lower alkyl, and lower alkoxy, and wherein X is a member selected from the group consisting of H, lower alkyl, and lower alkoxy, the resulting mixture being maintained at a temperature within the range of 100°–125° C., cooling the resultant mixture to a temperature between 20° C. and 25° C., and filtering the resultant crystalline product from said mixture.

References Cited in the file of this patent

UNITED STATES PATENTS

| | | |
|---|---|---|
| 1,933,217 | Lantz | Oct. 31, 1933 |
| 2,894,035 | Latourette et al. | July 7, 1959 |